US010664183B1

(12) United States Patent
Weaver et al.

(10) Patent No.: US 10,664,183 B1
(45) Date of Patent: May 26, 2020

(54) METHOD AND APPARATUS FOR STORING MEMORY ATTRIBUTES

(71) Applicant: Oracle International Corporation, Redwood City, CA (US)

(72) Inventors: David L. Weaver, Emerald Hills, CA (US); John R. Rose, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 85 days.

(21) Appl. No.: 15/629,680

(22) Filed: Jun. 21, 2017

Related U.S. Application Data

(63) Continuation of application No. 15/219,201, filed on Jul. 25, 2016, now abandoned.

(51) Int. Cl.
*G06F 12/00* (2006.01)
*G06F 3/06* (2006.01)

(52) U.S. Cl.
CPC .......... *G06F 3/0634* (2013.01); *G06F 3/0604* (2013.01); *G06F 3/0673* (2013.01)

(58) Field of Classification Search
CPC ..... G06F 3/0634; G06F 3/0604; G06F 3/0673
See application file for complete search history.

(56) References Cited

U.S. PATENT DOCUMENTS

| | | | |
|---|---|---|---|
| 4,244,034 A | 1/1981 | Cherba | |
| 4,247,901 A | 1/1981 | Martin et al. | |
| 4,247,909 A | 1/1981 | Bradley et al. | |
| 4,633,430 A | 12/1986 | Cooper | |
| 7,287,140 B1 * | 10/2007 | Asanovic | G06F 12/1483 711/163 |
| 7,755,631 B1 | 7/2010 | Mrazek et al. | |
| 8,307,151 B1 | 11/2012 | Caraccio et al. | |
| 8,706,957 B2 | 4/2014 | Caraccio et al. | |
| 8,959,122 B2 | 2/2015 | Yanai et al. | |
| 9,201,705 B2 | 12/2015 | Caraccio et al. | |
| 9,218,302 B2 * | 12/2015 | Grisenthwaite | G06F 12/1475 |
| 9,778,875 B2 | 10/2017 | Caraccio et al. | |
| 9,852,084 B1 * | 12/2017 | Soderquist | G06F 12/1483 |
| 2003/0188178 A1 * | 10/2003 | Strongin | G06F 12/1408 713/193 |

(Continued)

*Primary Examiner* — Arvind Talukdar
(74) *Attorney, Agent, or Firm* — Robert C. Kowert; Kowert, Hood, Munyon, Rankin & Goetzel, P.C.

(57) ABSTRACT

A system includes a processor and memory including one or more memory region groups, each including a plurality of distinct memory regions. In embodiments, each memory region of a particular memory region group has a same set of memory attributes and is associated with a same attribute group identifier (AGI). In response to an access request to a memory location of a memory region within the particular memory region group, the AGI may be used to identify the set of memory attributes to be applied when executing the access request. In response to a request to change one or more memory attributes of the particular memory region group, update of a single entry changes the memory attributes for all memory regions of the particular memory region group, without accessing individual metadata of each memory region. The update can be accomplished atomically and substantially simultaneously.

20 Claims, 10 Drawing Sheets

(56) References Cited

U.S. PATENT DOCUMENTS

| | | | |
|---|---|---|---|
| 2009/0113141 A1* | 4/2009 | Bullman | G06F 11/004 |
| | | | 711/147 |
| 2011/0219045 A1 | 9/2011 | Yanai et al. | |
| 2011/0321122 A1* | 12/2011 | Mwangi | G16H 10/60 |
| | | | 726/1 |
| 2012/0198272 A1* | 8/2012 | Zbiciak | H03K 19/0016 |
| | | | 714/6.11 |
| 2013/0019058 A1 | 1/2013 | Caraccio et al. | |
| 2014/0096235 A1* | 4/2014 | Fryman | G06F 12/14 |
| | | | 726/17 |
| 2014/0156961 A1* | 6/2014 | Hadley | G06F 21/54 |
| | | | 711/163 |
| 2014/0223087 A1 | 8/2014 | Caraccio et al. | |
| 2015/0378633 A1* | 12/2015 | Sahita | G06F 9/45558 |
| | | | 711/163 |
| 2016/0085476 A1 | 3/2016 | Caraccio et al. | |
| 2016/0170910 A1* | 6/2016 | Inamdar | G06F 12/1475 |
| | | | 711/163 |
| 2016/0210243 A1* | 7/2016 | Fernando | G11C 11/40615 |

\* cited by examiner

Address range – AGI Lookup Table 602

| Address range | AGI |
|---|---|
| 1 | A; Compressed |
| 2 | B |
| 3 | B |
| 4 | C; Dirty |
| 5 | A |
| 6 | B |
| 7 | A |
| 8 | B |
| 9 | C |
| 10 | A |
| 11 | B |
| 12 | A |
| 13 | B |
| 14 | A |
| 15 | B |
| 16 | C |

606, 608

AGI Key Table 604

| | |
|---|---|
| A | Read-only |
| B | Read&Write |
| C | No Access |
| D | (assignable) |
| E | (assignable) |
| F | (assignable) |
| G | (assignable) |

FIG. 6

METHOD AND APPARATUS FOR STORING MEMORY ATTRIBUTES

This application is a continuation of U.S. patent application Ser. No. 15/219,201, filed Jul. 25, 2016, which is hereby incorporated by reference herein in its entirety.

BACKGROUND

Field of the Invention

The embodiments herein relate to storage of, and access to, memory attributes.

Description of the Related Art

Modern processors may tag memory regions ("regions") with memory attributes ("attributes") such as readable, writable, executable, etc. Memory regions may be of various sizes. For example, some memories may include memory regions of size 8 KB (e.g. page), up to 1 GB or larger, or a cache line of a cache memory, or another size of a memory. The attribute is to apply to all memory locations within the memory region.

Each memory region may be tagged with its own attribute or set of attributes. When software or hardware wants to tag many memory regions with a common attribute (or set of attributes), each memory region may be tagged separately. Hence, the tagging may be accomplished by individual consecutive tagging of a collection of memory regions. If there is a large number of memory regions, the process of tagging each memory region can be time consuming and processor intensive. For memory regions that share one or more common memory attributes, if one or more of the memory attributes change (e.g., from read-only to writeable), each memory region will need to be retagged with an updated set of memory attributes, which can be time consuming and processor intensive and the change will not be atomic across those regions.

SUMMARY

Various embodiments of a system, a method, and an apparatus are disclosed in which the system may include a memory, an instruction cache including a plurality of cache lines, and a processor. The memory may include distinct memory regions ("regions"). A memory attribute ("attribute") is a characteristic ascribed to a region. The memory attribute may be applied when data stored in the region is accessed. A plurality of memory regions may be included in a memory region group that has a common set of memory attributes ("attributes") such as read-only, writeable, no access, contains compressed data, contains encrypted data, etc. The memory may include a plurality of such memory region groups, with each memory region group including a corresponding plurality of memory regions and each memory attribute identifiable by a corresponding attribute group identifier (AGI).

The processor may be configured to, for each request to access one or more memory locations in a particular memory region: determine a particular attribute group identifier (AGI) with which the particular memory region is associated; using the particular AGI, access an AGI key table to identify a particular set of attributes associated with the particular memory region group; and access the memory location(s) in the particular memory region according to the particular set of attributes.

The processor may determine that a change is to occur in the attributes of a particular group of memory regions. The processor can update the attributes for all regions of the particular memory region group by updating a single entry in the AGI key table referenced by the corresponding AGI. After updating of the entry in the AGI key table, subsequent accesses to memory locations in any memory region of the particular memory region group will be executed in accordance with the updated memory attribute(s) indicated in the AGI key table. Thus, by updating a single entry within the AGI key table, simultaneous and atomic updating of the memory attribute(s) of all memory regions of the particular memory region group is accomplished.

In an embodiment, if a particular memory region is a member of two or more memory region groups, updating of the corresponding memory attribute(s) may result in a conflict, and if so, a conflict resolution may be carried out to determine which memory attribute(s) are to be obeyed in response to a memory access request to the corresponding memory region.

BRIEF DESCRIPTION OF THE DRAWINGS

The following detailed description makes reference to the accompanying drawings, which are now briefly described.

FIG. 6 illustrates lookup tables that are utilized according to at least some embodiments.

Figure 1:
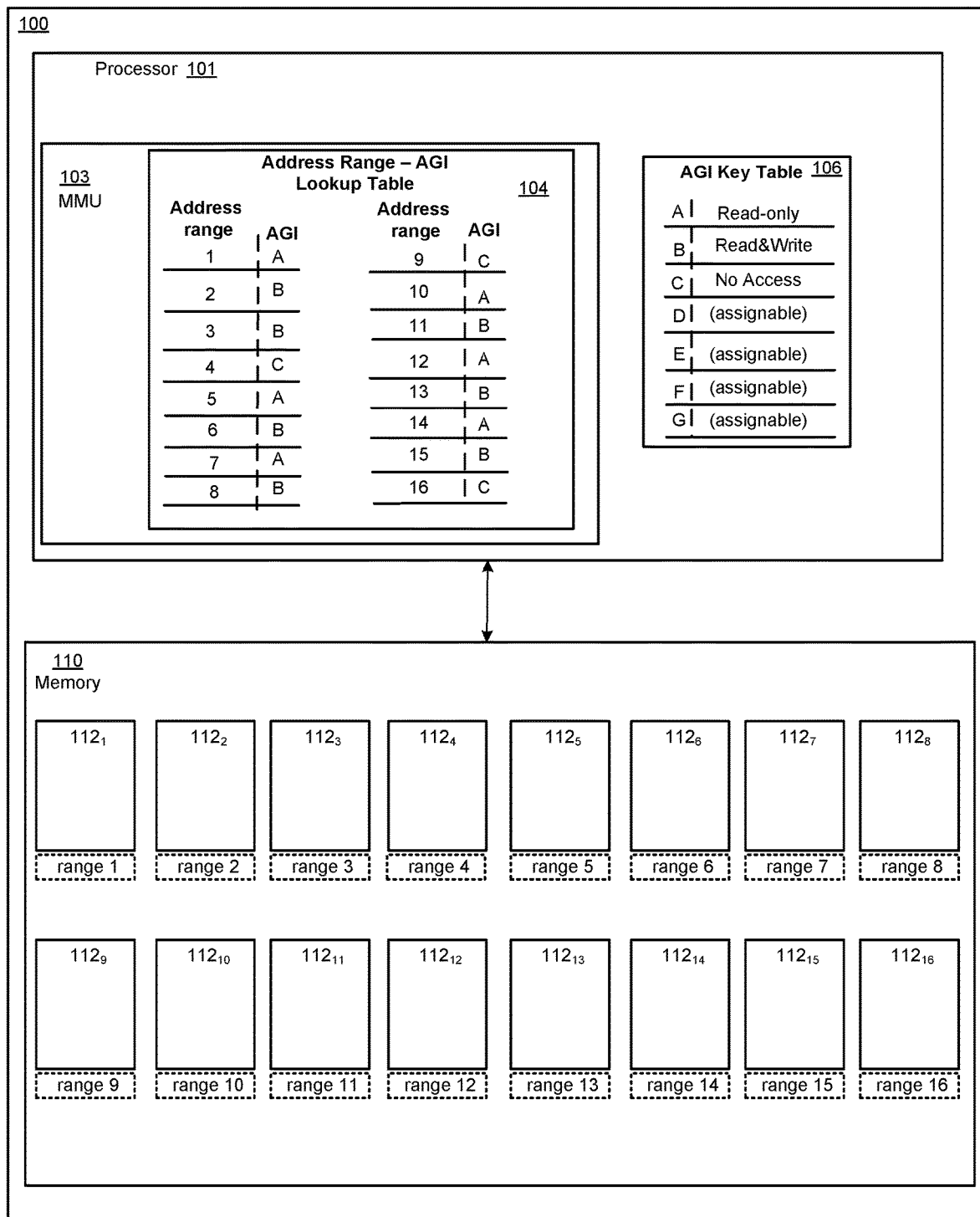
FIG. 1 illustrates an example of a system that associates various different memory regions with corresponding attributes, according to at least some embodiments.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Generally speaking, a processor core (or simply, a "core") may refer to a unit of a processor that is capable of executing program instructions and processing data independently of other processor cores within the processor, such that multiple cores may execute instructions concurrently.

It is noted that, as used herein, an "issued," "issuing," or to "issue" an instruction refers to selecting an instruction to be executed by a processor core. In a processor core that only supports in-order execution, issuing may include selecting a next instruction in a series of instructions. In a processor core that allows out-of-order processing, the core may include circuitry that selects an instruction to be issued ahead of a previously received instruction if the previously received instruction is stalled (e.g., cannot start or complete execution due to a resource limitation) and the selected instruction does not depend on the results of the previous instruction. In some embodiments, the processor core may provide for out-of-order processing of instructions. Also in some embodiments presented herein, the processor core may provide for superscalar processing of instructions (e.g., multiple independent instructions issued simultaneously).

FIG. 1 illustrates an example of a system that associates various different memory regions with corresponding attributes, according to at least some embodiments.

In the illustrated embodiment, system 100 includes processor 101 that includes one or more cores and a memory management unit (MMU) 103, and a system memory 110 that includes memory regions $112_i$ (shown are memory regions i=1 to 16), each memory region having a corresponding address range.

In various embodiments, system 100 may include multiple integrated circuits (ICs) coupled on one or more circuit boards or may be implemented as a single IC. In other embodiments, system 100 may include multiple cores as well as additional functional blocks, such as, for example, network and/or peripheral interfaces. In various embodiments, the organization of FIG. 1 may represent a logical organization rather than a physical organization, and other components may also be employed.

The processor 101 may be configured to execute instructions and to process data according to a particular Instruction Set Architecture (ISA). In some embodiments, the processor 101 may be configured to implement the SPARC® V9 ISA, although in other embodiments it is contemplated that any desired ISA may be employed, such as x86, PowerPC® or ARM®, for example. In various embodiments, a core of the processor 101 may include a single core or may correspond to a core complex including any suitable number of cores. Each core may support multitasking or multithreading. Such multithreaded cores are capable of supporting more than one software thread of execution (also referred to herein as a "software thread" or "thread") at a time. A processor core may operate in a multi-stranded mode. Each strand may include registers to maintain a virtual machine state in which instructions from a corresponding software thread are to be executed.

The processor 101 may also include hardware for implementing out-of-order or superscalar execution of program instructions, including circuits for predicting when a load instruction may be executed before a previously received store instruction. Processor 101 may further include hardware for detecting and recovering from a mis-predicted load instruction execution.

System memory (also "memory" herein) 110 may correspond to one or more types of memory for storing programs and data. System memory 110 may include volatile memory, such as Fully Buffered Dual Inline Memory Module (FB-DIMM), Double Data Rate, Double Data Rate 2, Double Data Rate 3, Double Data Rate 4, additional derivatives of Double Data Rate Synchronous Dynamic Random Access Memory (DDR/DDR2/DDR3/DDR4/DDR(X) SDRAM), or Rambus® DRAM (RDRAM®), for example. Non-volatile memory may also be included in system memory 110, such as, for example, a hard-disc drive (HDD), a solid state drive (SSD), DIMM-based nonvolatile memory, an optical disc storage (e.g., DVD-ROM or CD-ROM), or combination thereof. In some embodiments, system memory 110 may correspond to one or more memory controllers used to interface with the above types of memories. Upon an L3 cache miss, system memory 110 may be the next memory to be accessed in order to locate the requested data.

Processor 101 includes a memory management unit (MMU) 103, which may be implemented in hardware, in software, or in a combination thereof. The MMU 103 includes an address range-attribute group identifier (AGI) lookup table 104. The processor 101 also includes AGI key table 106. In other embodiments (not shown) one or both of the address range-AGI lookup table 104 and the memory attribute directory 104 may be stored elsewhere instead of in the MMU 103.

In response to a request to access a particular memory location of system memory 110 (e.g., to access stored data, to write to the particular memory location, etc.), the MMU 103 may utilize a translation lookaside buffer (TLB) to determine a physical address of the particular memory location from a virtual memory address provided in the request. The MMU 103 looks in the Address Range-AGI Lookup Table 104 to determine the AGI associated with the address range that includes the (physical) address of the particular memory location. Using the AGI key table 106 and the AGI determined via the Address Range-AGI Lookup Table 104, the processor 101 can determine which memory attribute(s) are associated with the particular memory location. In some embodiments, attributes may include one or more of read-only, read-write, no access, compressed, encrypted, dirty, in garbage collection, or other attributes.

As an example, memory regions $112_1$, $112_5$, $112_7$, $112_{10}$, $112_{12}$, and $112_{14}$ are included in a particular memory region group with the AGI=A. Memory regions $112_2$, $112_3$, $112_6$, $112_8$, $112_{11}$, $112_{13}$, and $112_{15}$ are included in a different memory region group with the AGI=B. Memory regions $112_4$, $112_9$, and $112_{16}$ are included in another memory region group with the AGI=C. The MMU 103 can access the Address Range-AGI Lookup Table 104 to determine the AGI of the memory region $112_i$ that includes the particular memory location to be accessed. The MMU 103 accesses the AGI key table 106 to determine the associated memory attribute(s) for all memory regions with a particular AGI. (In some embodiments, a given AGI may be associated with a plurality of non-conflicting attributes.)

An access request to memory region $112_1$ results in a lookup to the Address Range-AGI Lookup Table 104, to determine that the associated AGI=A. The MMU 103 then accesses the AGI key table 106 to determine that the attribute corresponding AGI=A is "read-only". If several memory locations are to be accessed, where each of the memory locations is within a memory region of the same memory region group AGI=A, then a single lookup to the AGI key table 106 is sufficient to identify the one or more memory attribute that applies to each of the memory regions of that memory region group.

If a request is received, e.g., from an operating system or from a memory management tool to change a particular memory attribute(s) of a particular memory region group, that particular memory attribute can be changed atomically by updating, in the AGI key table 106, the attribute entry assigned to the AGI of the memory region group. For example, if the memory region group corresponding to AGI=A is to be changed from the attribute "read-only" to "read & write", changing the attribute entry corresponding to AGI=A in the AGI key table 106 from "read-only" to "read & write" changes the associated memory attribute atomically and simultaneously for all memory regions of the particular memory region group.

Thus, changing, in the AGI key table 106, a single attribute entry that corresponds to the AGI of the memory region group, changes the corresponding memory attribute in all memory regions of the memory region group simultaneously and atomically.

Effecting the change in memory attribute(s) of the memory regions by a single update to a table entry can result in a significant saving of execution time and execution cycles, as compared with separately updating the memory attribute(s) of each member of the memory region group. That is, a given memory attribute can be changed by changing a single attribute entry (e.g., in an AGI key table), without addressing individual metadata for each memory region of a particular memory region group to individually change the given memory attribute (in the corresponding metadata) of each of the memory regions of the particular memory region group. Hence, attributes can be encoded once for the memory region group, instead of being encoded per memory region. For N memory regions that share attributes, there is one set of attributes to maintain instead of N sets of attributes to maintain.

According to some embodiments, a memory attribute may include software-definable fields, e.g., garbage collection entries or card-mark table entries. Memory access instructions may allow software-definable fields of a memory attribute to be directly read and written by software.

Embodiments may reduce overhead to dynamically choose which subsets of memory region groups are active at a given time.

Embodiments may reduce overhead to enable read or write barriers on dynamically varying regions of garbage-collected memory.

Embodiments may reduce overhead to collect and track dirty bits for structures in garbage-collected memory, including discontiguous managed heaps.

According to some embodiments, storage associated with a memory region group may accumulate event counts or flags that indicate state changes, e.g., cache line state changes (e.g., dirty states).

According to some embodiments, some attributes can be stored in less-privileged memory than other memory region attributes (e.g., an AGI key table may be split into multiple portions, including an AGI key table portion stored in a less privileged memory than another AGI key table portion), in order to provide faster access to managed runtimes.

Figure 2:
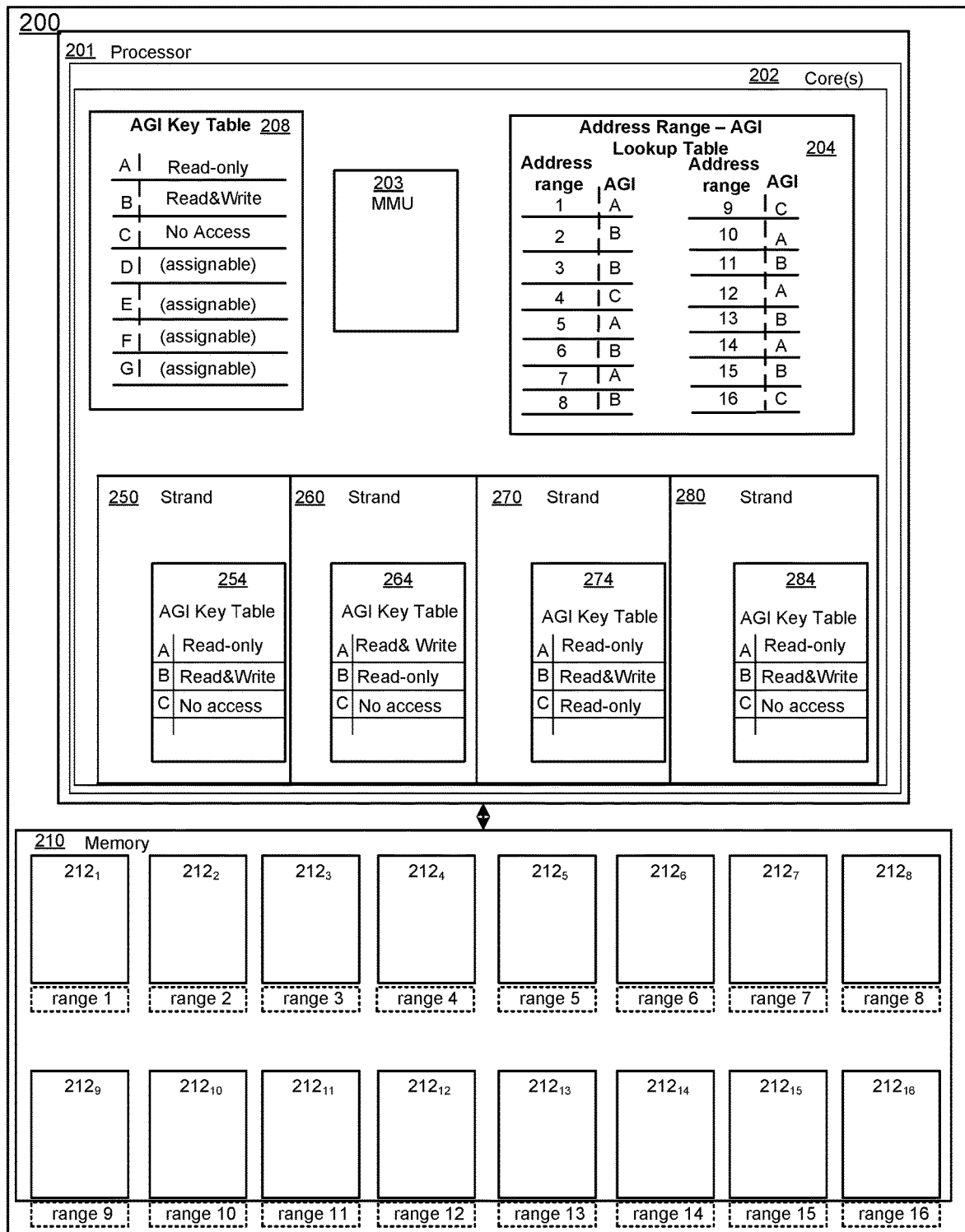
FIG. 2 illustrates an example of a system to associate one or more attributes to memory regions of a memory in various strands of a multi-strand processor, according to at least some embodiments.

FIG. 2 illustrates an example of a system to associate one or more attributes to memory regions of a memory in various strands of a multi-strand processor, according to at least some embodiments.

It is noted that FIG. 2 is merely an example of a system including a processor and memories. The system 200 may include additional functional blocks, such as, for example, network and/or peripheral interfaces. In various embodiments, the organization of FIG. 2 may represent a logical organization rather than a physical organization, and other components may also be employed.

System 200 includes a processor 201 including core(s) 202, and system memory 210. In this illustrative embodiment, the core 202 contains strands 250, 260, 270, 280. In other embodiments there may be more than four strands or fewer than four strands executing in a core 202. Each strand may include registers to maintain a virtual machine state in which instructions from a corresponding software thread are to be executed.

Each of the strands accesses its own AGI key table. That is, strand 250 accesses AGI key table 254; strand 260 accesses AGI key table 264; strand 270 accesses AGI key table 274; strand 280 accesses AGI key table 284. The AGI key tables may differ from strand to strand.

In operation, instructions are executed in a strand according to the AGI key table of the strand. For example, memory access instructions executed via strand 250 are executed using the corresponding attributes of AGI key table 254. When processed by strand 250, as indicated in AGI key table 254, any instruction that includes an access request to a memory location within a memory region of the memory region group whose AGI=A accesses the memory location in a "read-only" mode. However, according to AGI key table 264, instructions executed via strand 260 and that include one or more access requests to memory locations of the memory region group whose AGI=A may access the memory location in a "read & write" mode. Thus, through use of multiple AGI key tables, different strands may process a request to the same memory location according to different attributes.

All memory regions within a particular memory region group (e.g., having the same AGI) can have the assigned attribute(s) changed atomically by a single update to the AGI key table of the strand that is to process access requests.

In some embodiments, one or more of the AGIs can be associated with a plurality of attributes. When a change is made to one of the attributes in an AGI key table, the updated attribute applies simultaneously (or substantially simultaneously) to all memory regions of the associated memory region group. For example, in another embodiment (not shown), AGI=A can be associated with "read-only" and also with "compressed data." A memory management tool (or the operating system) may request a change of the "read-only," attribute as applied in a particular strand, to "read and write." The change can be made atomically by updating the corresponding entry in the AGI key table of the corresponding strand, and the update will apply substantially simultaneously to all memory regions of the memory region group with AGI=A.

Figure 3:
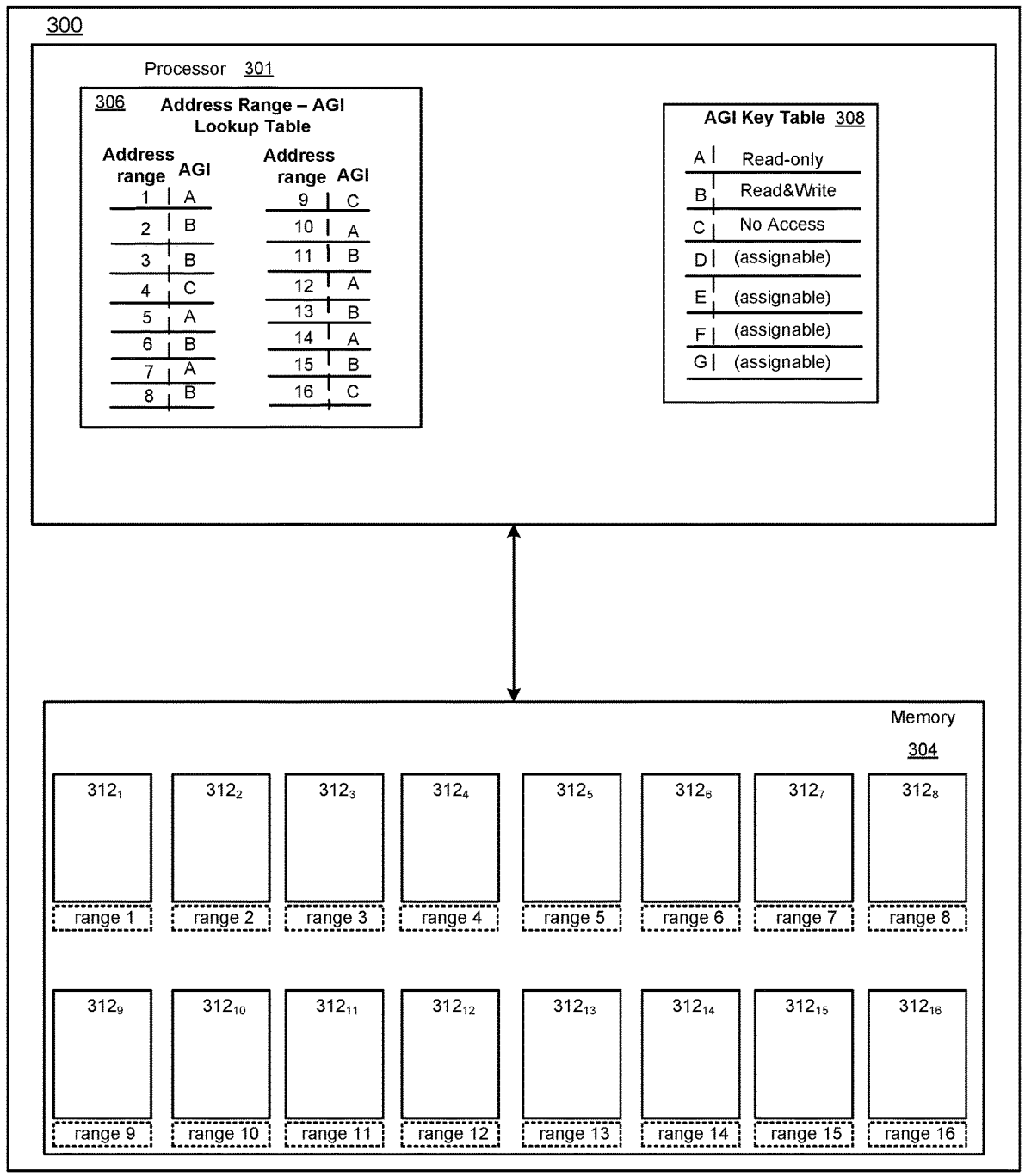
FIG. 3 illustrates an example of a system that associates various different memory regions with corresponding attributes, according to at least some embodiments.

FIG. 3 illustrates an example of a system that associates various different memory regions with corresponding attributes, according to at least some embodiments.

In the illustrated embodiment, system 300 includes processor 301. In various embodiments, system 300 may include multiple integrated circuits (ICs) coupled on one or more circuit boards, may include one or more field programmable gate arrays (FPGAs) or other programmable logic devices, may include one or more discrete components, or may be implemented as a single IC.

System memory 304 can include a plurality of memory regions $312_1$-$312_N$. Memory regions may be contiguous, or may be physically separated from one another. Each memory location within a memory region can have an identical set of attributes. For example, memory region $312_1$ may have the memory attribute "read-only," and so each memory location within memory region $312_1$ is a read-only memory location.

In the embodiment illustrated in FIG. 3, the processor 301 includes an Address Range-AGI Lookup Table 306 and an AGI key table 308. If a memory management tool (e.g., hardware within the processor 301 or software executed by the processor 301) wishes to change the memory attribute of all of the memory regions of a memory region group, e.g., having AGI=A, the memory management tool can update, the (single) entry corresponding to AGI=A within the AGI key table 308. Thus, a change of a single entry in AGI key table 308 results in a simultaneous and atomic attribute change in the plurality of the memory regions of the attribute group.

Figure 4:
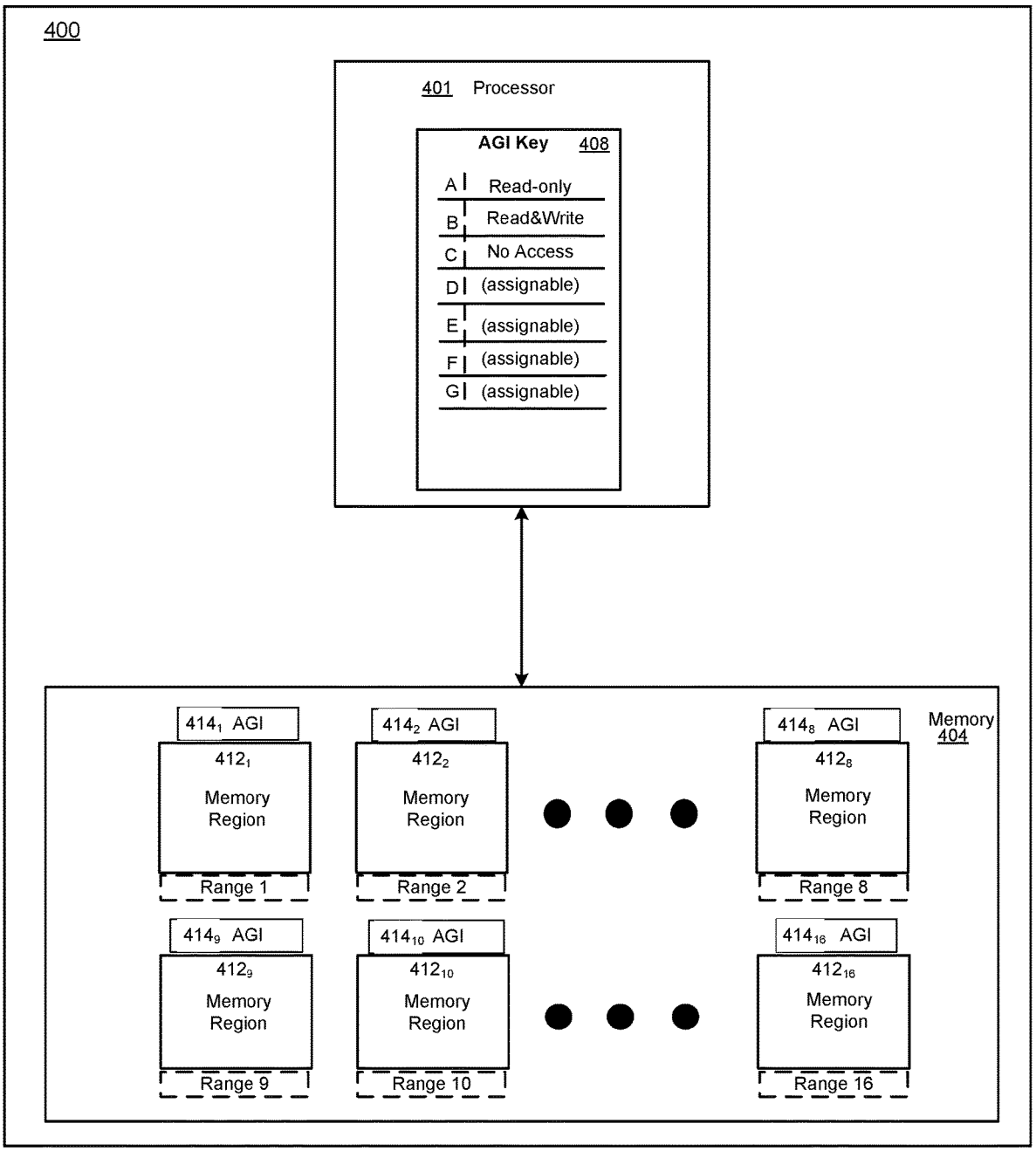
FIG. 4 illustrates an example of a system to associate attributes to various memory regions of a memory, according to at least some embodiments.

FIG. 4 illustrates an example of a system to associate attributes with various memory regions of a memory, according to at least some embodiments.

System 400 includes a processor 401 and memory 404. The memory 404 includes a plurality of memory regions $412_1$-$412_N$. (regions $412_1$-$412_{16}$ are shown in FIG. 4). Each of the memory regions $412_i$ (i=1, N) has an associated metadata storage $414_i$ that stores an AGI of the memory region $412_i$. The processor 401 also includes an AGI key table 408 that may be stored in, e.g., a core of the processor 401, an MMU of the processor 401, or another portion of the processor 401. The AGI key table 408 enables the processor 401 to determine (and/or associate) the memory attribute(s) associated with each memory region $412_i$.

In operation, a request to access data stored in memory 404 may be received by the processor 401. The processor 401 determines, from the address of the data, which memory region $412_i$ stores the requested data. The processor 401 reads the AGI metadata stored in metadata storage portion $414_i$, and the processor uses the AGI stored in the metadata storage portion $414_i$ with the AGI key lookup table 408 to determine the memory attribute(s) of the memory region $412_i$. The processor 401 then accesses the requested data in accordance with corresponding the memory attribute(s) determined via lookup in the AGI key lookup table 408.

At some point, a memory management module (e.g., a memory management unit (MMU), or management software, or another memory management tool) determines that one or more attributes of a particular memory region group are to be changed. Modification of a single entry in the AGI key table 408 corresponding to the AGI of the memory region group changes the memory attribute(s) of all memory regions of a particular memory region group substantially simultaneously, which may be accomplished by execution of a single atomic instruction.

Figure 5:
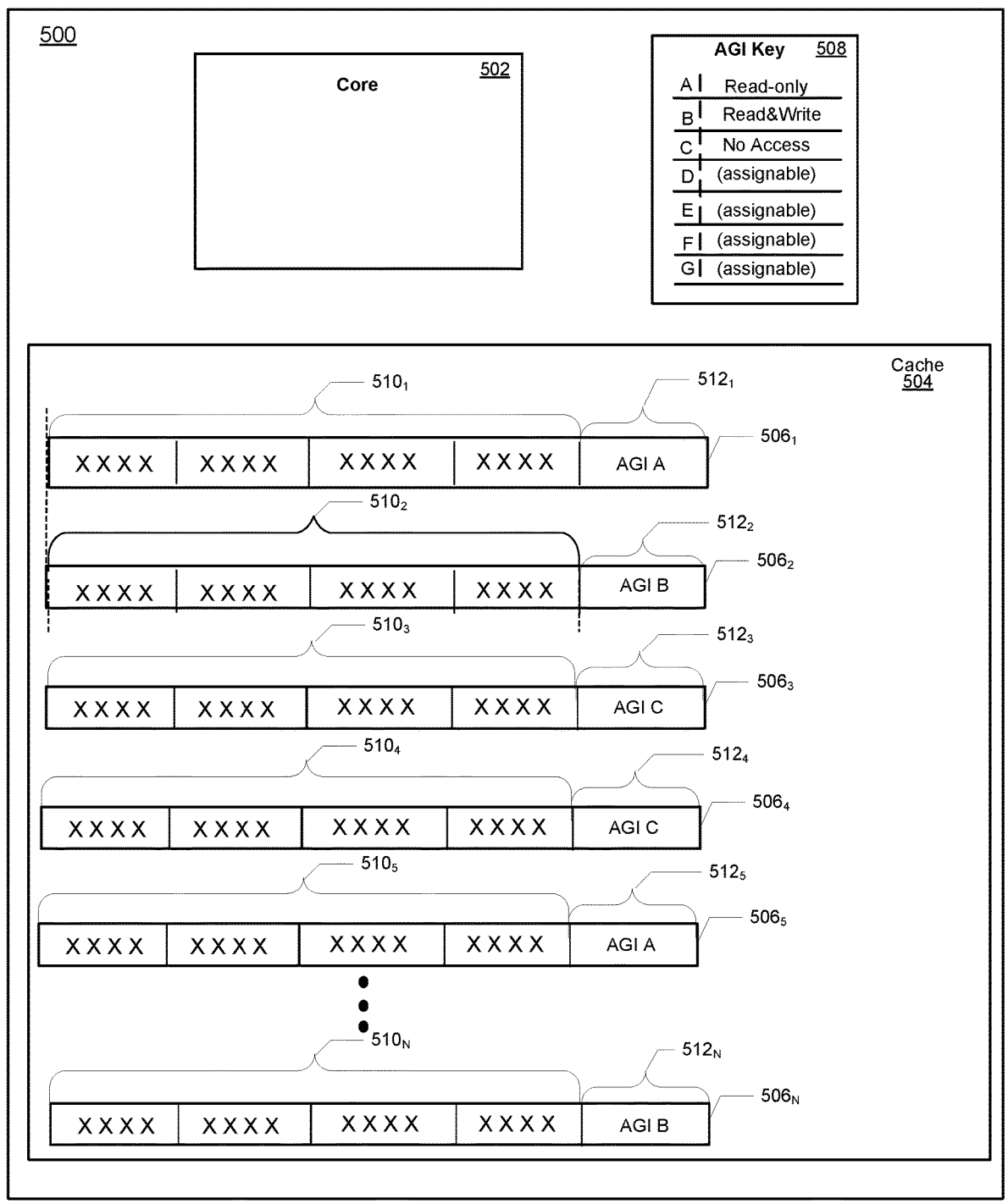
FIG. 5 illustrates an example of a system to determine attributes of various cache lines of a cache memory, according to at least some embodiments.

FIG. 5 illustrates an example of a system to determine attributes of cache lines of a cache memory, according to at least some embodiments.

Processor 500 includes a cache 504. The processor 500 also includes additional components, e.g., cores, memory management unit, additional circuitry, etc. The processor also accesses an AGI key table 508.

As shown in FIG. 5, cache 504 includes a plurality of cache lines $506_1$, $506_2$, $506_3$ ... $506_N$. Each cache line $506_i$ (i=1, N), includes a corresponding data portion $510_i$ and a corresponding AGI portion $512_i$. Each AGI portion $512_i$ stores a representation of an AGI value for the corresponding cache line $506_i$. Cache lines that are in a particular memory region group have one or more memory attribute(s) in common, and their respective AGI portions $512_i$ store an identical representation of the AGI value.

In operation, responsive to a request to access a particular cache line $506_x$, the core 502 reads the associated AGI portion $512_x$ and performs a lookup in the AGI key table 508 to determine, from the AGI portion $512_x$, the memory attribute(s) of the cache line $506_x$. Alternatively (not shown), the AGI value associated with a cache line may be matched with content-addressable memory containing AGI values to then look up the corresponding memory attribute(s). The core 502 then accesses the data portion $510_x$ of the particular cache line $506_x$ in accordance with the memory attribute(s) determined via lookup in the AGI key table 508.

If a memory management tool of the system 500 (e.g., memory management unit, or memory management software, or other memory management tool) determines that a change of memory attribute(s) of a particular memory region group (e.g., a plurality of cache lines) is to occur, the change can be effected by updating (executed atomically) a single entry of the AGI key table 508 (or content-addressable memory) that causes a substantially simultaneous change of memory attribute(s) the cache lines of the particular memory region group.

FIG. 6 illustrates lookup tables that are utilized according to at least some embodiments.

Shown are an Address Range-AGI Lookup Table 602 and an associated AGI key table 604. Each entry of the Address Range-AGI Lookup Table 602 associates an address range of a memory region of a memory, to a corresponding AGI. Several memory regions (each memory region is represented by an associated address range) are associated with the same AGI. For example, memory regions with address ranges 1, 5, 7, 10, 12, and 14 are associated with AGI=A. As determined via the AGI key table 604, the memory locations of address ranges 1, 5, 7, 10, 12, and 14 are accessible as "read-only."

Additionally, some entries may indicate one or more attributes not shared by a plurality of memory regions. For example, as seen on line 606 of the Address Range-AGI Lookup Table 602, the data stored in memory locations of address range 1 is compressed data. The memory attribute "compressed" is not shared with any of the other memory regions shown in Address Range-AGI Lookup Table 602.

Also, as shown in line 608, data stored in the address range 4 is "dirty" data, and the AGI=C indicates that the data within address range 4 is inaccessible.

If at some point, a memory management tool of a system that includes tables 602 and 604 determines that the memory attribute(s) of a given memory region group are to be changed, a single change may be made in the entry within the AGI key table 604 that corresponds to the respective AGI of the memory region group. Thus, by changing a single entry (e.g., atomically), the attributes of a plurality of memory locations can be changed substantially simultaneously. However, the attributes that are indicated to apply to only one particular memory region (e.g., only one address range) are not affected by a change in the AGI key table 604 (unless the change is to an attribute of an AGI that only applies to the one particular memory region).

Figure 7:
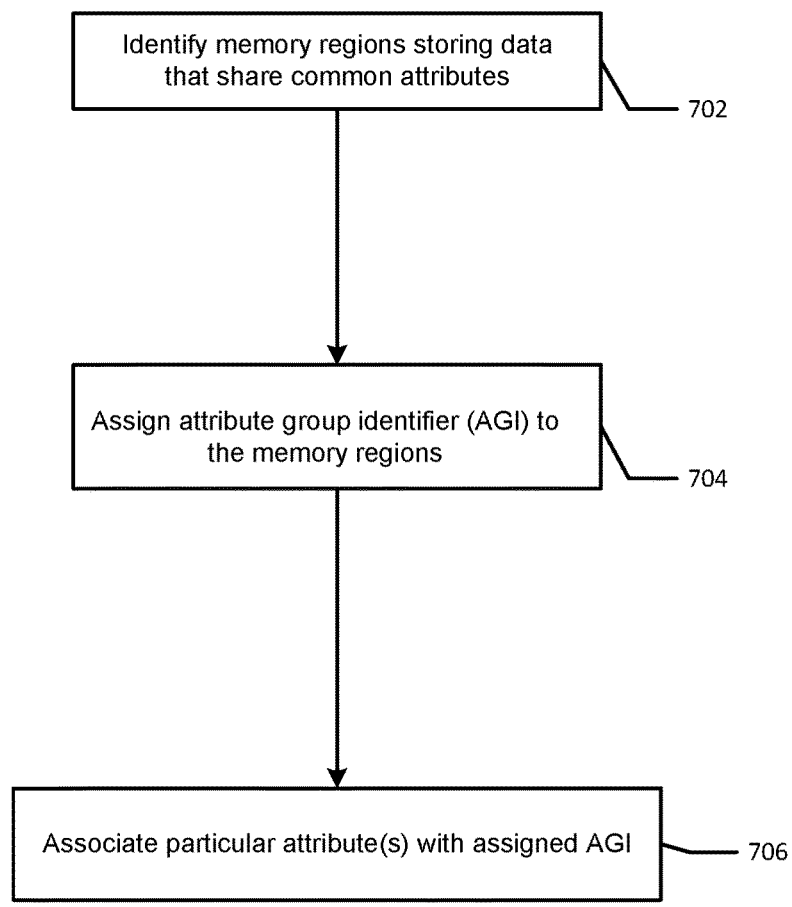
FIG. 7 is a flow diagram illustrating aspects of operation that may be performed to assign AGIs to memory regions of a memory region group, according to at least some embodiments.

FIG. 7 is a flow diagram illustrating aspects of operation that may be performed to assign AGIs to memory regions of a memory region group, according to at least some embodiments.

At block 702, memory regions storing data that share one or more attributes are identified (e.g., members of a memory region group). For example, some of the attributes may include, but are not limited to, executable, read-only, writeable, no access, contains compressed data, contains encrypted data, includes dirty data, in garbage collection mode, etc.

Continuing to block 704, for each memory region group, an AGI is assigned to the plurality of memory regions of the memory region group, e.g., in an Address Range-AGI Lookup Table, or in corresponding metadata of each memory region. The AGI enables identification of the corresponding memory attribute(s) of the memory region group. Advancing to block 706, each AGI is associated with the one or more memory attribute(s) of the memory region group, e.g., in a lookup table such as an AGI key table.

Figure 8:
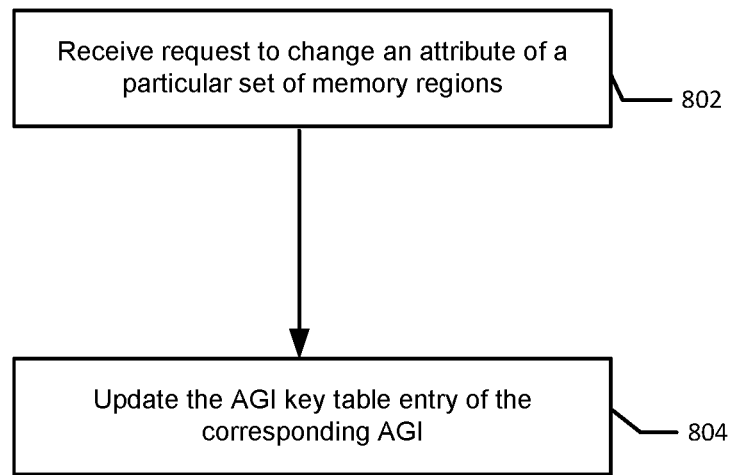
FIG. 8 is a flow diagram illustrating aspects of operation that may be performed to change an attribute of a memory region group that includes a plurality of memory regions of a memory, according to at least some embodiments.

FIG. 8 is a flow diagram illustrating aspects of operation that may be performed to change an attribute of a memory region group that includes a plurality of memory regions of a memory, according to at least some embodiments.

At block 802, a request is received, e.g., by a processor of a system, to change one or more attributes of a particular memory region group that includes a corresponding particular set of memory regions.

Continuing to block 804, an AGI key table entry is updated to reflect the change in the memory attribute(s) of the particular memory region group. Updating the (single) AGI table entry updates the memory attribute(s) of all memory regions of the particular memory region group, atomically and substantially simultaneously. Thus, the change to the attribute(s) of all of the memory regions of the particular memory region group is accomplished without accessing individual metadata of each memory region of the particular memory region group.

Figure 9:
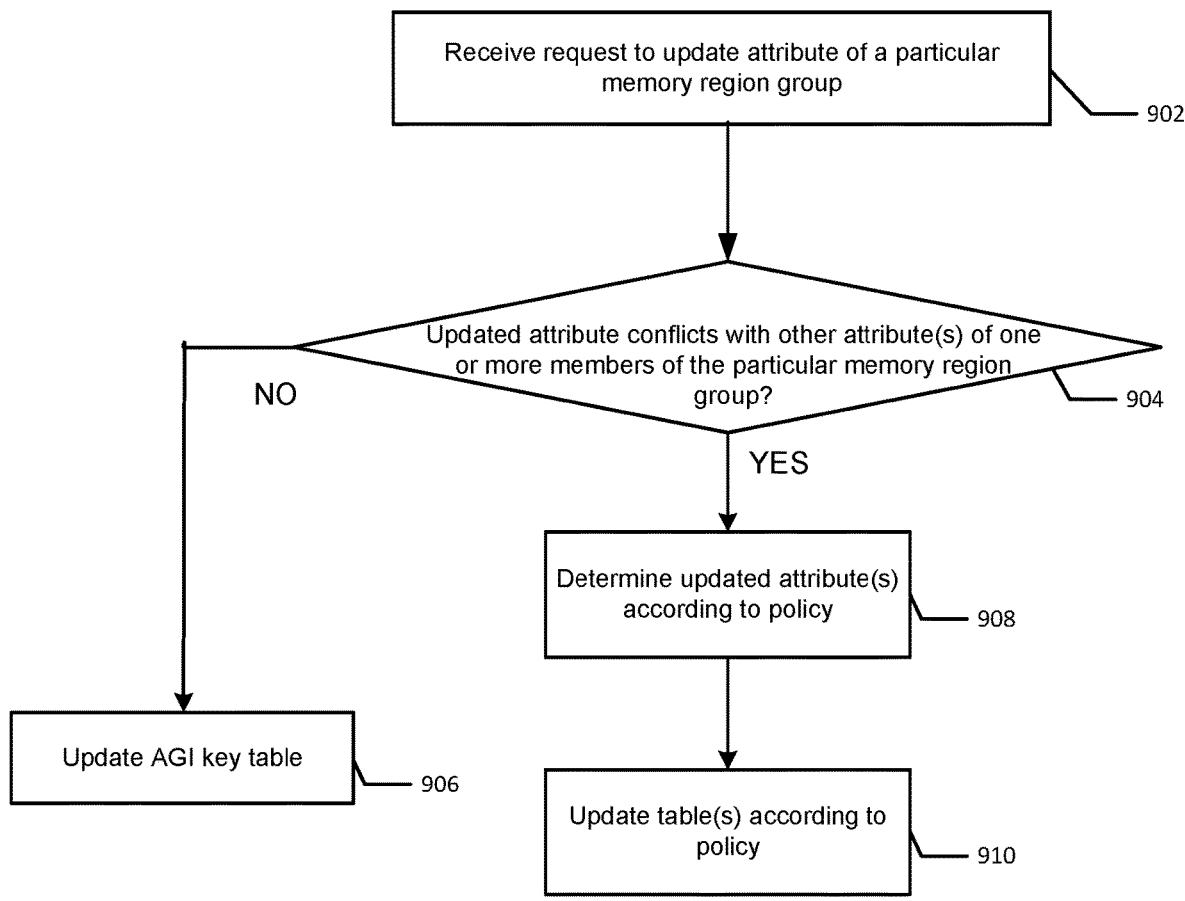
FIG. 9 is a flow diagram illustrating aspects of operation that may be performed to update an attribute of a memory region group and for dealing with a conflict, according to at least some embodiments.

FIG. 9 is a flow diagram illustrating aspects of operation that may be performed to update an attribute of a memory region group and for dealing with a conflict, according to at least some embodiments.

In some embodiments, a given memory region of a particular memory region group may have a memory attribute not shared by other memory regions of the particular memory region group. For example, the given memory region also belong another memory region group, e.g., shares attributes with two (or more) memory region groups. Alternatively, the given memory region may be accessible according the attributes of the particular memory region group and may also have an additional attribute not shared by other memory regions of the particular memory region group. In such cases, the given memory region may have a conflict with an updated attribute while other memory regions do not have that conflict.

At block 902, a request is received to update an attribute of a particular memory region group. Continuing to decision diamond 904, if the updated attribute conflicts with any of the other attributes of one or more members of the particular memory region group, the method proceeds to block 908; otherwise the method proceeds to block 908, and the AGI key table is updated to reflect the update of the attribute as requested.

If there is a conflict between the updated attribute and one or more existing attributes of a given memory region of the memory region group, advancing to block 908 a set of updated attributes of the given memory region may be determined according to policy. For example, the updated set of attributes for the given memory region may be determined according to priority order, or "as-is" attribute values, and/or inherited attribute values (e.g., tagging the attribute value as "as-is" allows attribute values to be inherited.) Proceeding to block 910, an AGI key table (and/or an Address Range-AGI Lookup Table e.g., when conflicts in individual memory regions are to be resolved) may be updated to reflect the request and the resolution of the conflict with attributes that have been previously assigned to the memory region(s).

Example Computing System

Figure 10:
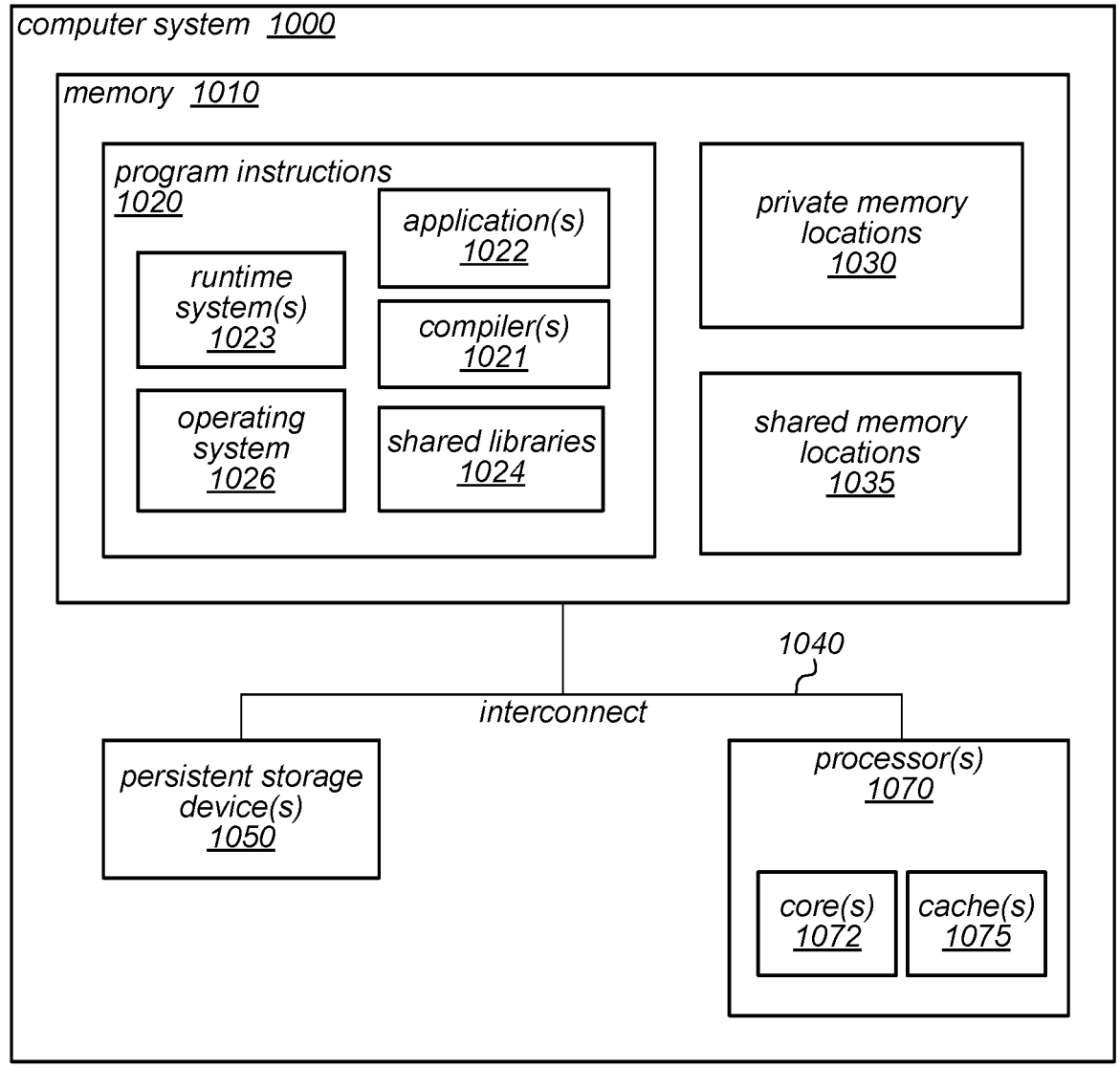
FIG. 10 illustrates one embodiment of a computing system that is configured to implement and/or support the embodiments described herein.

FIG. 10 illustrates a computing system configured to implement some or all of the methods described herein, according to at least some embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing the techniques described herein (including assignment of a single attribute group index (AGI) to a plurality of memory regions, assignment of one or more attributes to each memory region of the plurality of memory regions via the AGI, and implementing a change in the attributes atomically and simultaneously to the plurality of memory regions) may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each processor 1070 may include multiple cores 1072, any of which may be single or multi-threaded. For example, multiple processor cores 1072 may be included in a single processor chip (e.g., a single processor 1070), and multiple processor chips may be included on a CPU board, one or more of which may be included in computer system 1000. Each of the processors 1070 may include a hierarchy of caches 1075, in various embodiments. For example, each processor chip may include multiple L1 caches 1075 (e.g., one per processor core 1072) and one or more other caches 1075 (which may be shared by the processor cores 1072 on the processor chip). Each processor 1070 may also include one or more other resources that are shared between two or more cores 1072 (e.g., a floating point divide unit or a specialized accelerator for encryption or compression), in some embodiments. The computer system 1000 may also include one or more persistent storage devices 1050 (e.g. optical storage, magnetic storage, hard drive, tape drive, solid state memory, etc.) and one or more system memories 1010 (e.g., one or more of cache, SRAM, DRAM, RDRAM, EDO RAM, DDR RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the memory 1010 may be coupled to the system interconnect 1040. One or more of the system memories 1010 may contain program instructions 1020. Program instructions 1020 may be executable to implement one or more compilers 1021, one or more applications 1022 (which may include parallel computations suitable for execution on multiple hardware contexts), one or more runtime systems 1023 (which may include resource-management-enabled runtime systems), shared libraries 1024, and/or operating systems 1026. In some embodiment, program instructions 1020 may be executable to implement a contention manager (not shown). Program instructions 1020 may be encoded in platform native binary, any interpreted language such as Java™ byte-code, or in any other language such as C/C++, Java™, etc. or in any combination thereof. Support and functions may exist in one or more of the shared libraries 1024, operating systems 1026, or applications 1022, in various embodiments.

The memory 1010 may further comprise private memory locations 1030 and/or shared memory locations 1035 where data may be stored. For example, shared memory locations 1035 may store various tables, in various embodiments. In addition, the memory 1010 and/or any of the caches of processor(s) 1070 may, at various times, store state information for jobs, work items or work tickets, priority information for jobs and/or hardware contexts, identifiers of jobs, software threads and/or hardware contexts, various counters or flags, threshold values, policy parameter values, maximum count values, and/or any other data usable in implementing the techniques described herein, some of which may include values that are configurable by the programmer or by a user.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a processor; and
   a system memory coupled to the processor, wherein the system memory comprises a plurality of regions corresponding to respective portions of a system memory address space for the processor;
   the processor comprising a memory management unit configured to perform memory operations to respective regions of the plurality of regions of the system memory for memory access instructions executed by the processor;
   wherein the processor is configured to:
     assign a respective attribute group identifier (AGI) to respective regions of the plurality of regions to associate each respective region with a respective memory region group, wherein regions assigned a same AGI belong to a same memory region group, wherein each region of a first set of the plurality of regions is assigned a first AGI for a first memory region group, and each region of a second set of the plurality of regions is assigned a second AGI for a second memory region group; and
     store a group attribute table comprising a respective entry for each different AGI, wherein each respective entry stores one or more memory attributes to be applied to regions to which the AGI for that entry is assigned;
   wherein the memory management unit is further configured to, responsive to an access request to access a particular region:
     determine an AGI assigned to the particular region of the access request;
     based on the determined AGI, access the entry of the group attribute table for the determined AGI to obtain at least one of the one or more memory attributes from the entry; and
     apply the at least one of the one or more memory attributes obtained from the entry of the group attribute table for the determined AGI, in processing the access request to access the particular region.

2. The system of claim 1, wherein the processor is further configured to atomically update an entry in the group attribute table so that a change to one or more memory attributes for a particular AGI take effect substantially simultaneously for each region of a plurality of regions to which the particular AGI is assigned.

3. The system of claim 1, wherein the one or more memory attributes stored for each entry of the group attribute table comprise at least one of a read-only region attribute, a not-accessible region attribute, an executable region attribute, a writeable region attribute, an encrypted region attribute, a compressed region attribute, a dirty region attribute, an encrypted region attribute, or a garbage collection state attribute.

4. The system of claim 1, wherein the plurality of regions correspond to respective cache lines, and wherein to assign a respective AGI for each respective region of the plurality of regions, the processor is further configured to specify the respective AGI for each respective cache line.

5. The system of claim 1, wherein the plurality of regions correspond to respective pages of the system memory, and wherein to assign a respective AGI for each respective region of the plurality of regions, the processor is further configured to specify the respective AGI in respective page table entries for each respective page.

6. The system of claim 1, wherein the processor is further configured to assign individual memory attributes to individual ones of the plurality of regions, wherein at least one region is assigned both an individual memory attribute and an AGI for one or more memory attributes, wherein the AGI applies to one of the one or more memory region groups to which the at least one region belongs.

7. The system of claim 1, wherein the group attribute table comprises a plurality of entries, wherein each entry is associated with a unique AGI and stores a respective set of one or more memory attributes, wherein the group attribute table specifies different memory attributes for at least two different AGIs.

8. The system of claim 1, wherein for a given region assigned multiple AGIs, or assigned one or more individual memory attributes and one or more AGIs, the memory management unit is configured to:
  detect a conflict between memory attributes for the given region in response to a memory access operation to the given region; and
  apply a conflict resolution process to select one or more of the memory attributes for the memory access operation.

9. The system of claim 1, wherein the processor is further configured to assign more than one AGI to the same region such that memory attributes from two or more corresponding entries of the group attribute table apply to the same region.

10. A method, comprising:
  assigning, by a processor comprising circuitry that executes instructions, a respective attribute group identifier (AGI) for each respective region of a plurality of regions of a system memory to associate each respective region with a respective memory region group, wherein regions assigned a same AGI belong to a same memory region group, wherein each region of a first set of the plurality of regions is assigned a first AGI for a first memory region group, and each region of a second set of the plurality of regions is assigned a second AGI for the second memory region group;
  storing a group attribute table comprising a respective entry for each different AGI, wherein each respective entry stores one or more memory attributes to be applied to regions to which the AGI for that entry is assigned; and
  responsive to receiving an access request to access a particular region:
    determining an AGI assigned to the particular region of the access request;
    based on the determined AGI, accessing the entry of the group attribute table for the determined AGI to obtain at least one of the one or more memory attributes from the entry; and
    applying the at least one of the one or more memory attributes obtained from the entry of the group attribute table for the determined AGI, in processing the access request to access the particular region.

11. The method of claim 10, further comprising atomically updating an entry in the group attribute table so that a change to one or more memory attributes for a particular AGI take effect substantially simultaneously for each region of a plurality of regions assigned that AGI.

12. The method of claim 10, wherein the one or more memory attributes stored for each entry of the group attribute table comprise one or more of a read-only region attribute, a not-accessible region attribute, an executable region attribute, a writeable region attribute, an encrypted region attribute, a compressed region attribute, a dirty region attribute, or a garbage collection state attribute.

13. The method of claim 10, further comprising assigning individual memory attributes to individual ones of the plurality of regions, wherein a given region is assigned both an individual memory attribute and an AGI associated with one or more memory attributes that apply to one of the one or more memory region groups to which the given region belongs.

14. The method of claim 10, wherein the group attribute table comprises a plurality of entries, wherein each entry is associated with a unique AGI and stores a respective set of one or more memory attributes, wherein the group attribute table specifies different memory attributes for at least two different AGIs.

15. The method of claim 10, further comprising assigning more than one AGI to the same region such that memory attributes from two or more corresponding entries of the group attribute table apply to the same region.

16. A processor, comprising:
  circuitry configured to perform memory management including performance of memory operations to respective regions of a plurality of regions of a system memory for memory access instructions executed by the processor;
  wherein the processor is configured to:
    assign a respective attribute group identifier (AGI) for each respective region of the plurality of regions to associate each respective region with a respective memory region group, wherein regions assigned a same AGI belong to a same memory region group, wherein each region of a first set of the plurality of regions is assigned a first AGI for a first memory region group, and each region of a second set of the plurality of regions is assigned a second AGI for a second memory region group; and
    store a group attribute table comprising a respective entry for each different AGI, wherein each respective entry stores one or more memory attributes to be applied to regions to which the AGI for that entry is assigned; and
    responsive to an access request to access a particular region:
      determine an AGI assigned to the particular region of the access request;
      based on the determined AGI, access the entry of the group attribute table for the determined AGI to obtain at least one of the one or more memory attributes from the entry; and
      apply the at least one of the one or more memory attributes obtained from the entry of the group attribute table for the determined AGI, in processing the access request to access the particular region.

17. The processor of claim 16, wherein the processor is further configured to atomically update an entry in the group attribute table so that a change to one or more memory attributes for a particular AGI take effect substantially simultaneously for each region of a plurality of regions assigned the particular AGI.

18. The processor of claim 16, wherein the one or more memory attributes stored for each entry of the group attribute table comprise one or more of a read-only region attribute, a not-accessible region attribute, an executable region attribute, a writeable region attribute, an encrypted region attribute, a compressed region attribute, a dirty region attribute, or a garbage collection state attribute.

19. The processor of claim 16, wherein the processor is further configured to assign individual memory attributes to individual ones of the plurality of regions, wherein at least one region is assigned both an individual memory attribute and an AGI for one or more memory attributes that apply to one of the one or more memory region groups to which the individual region belongs.

20. The processor of claim 16, wherein the group attribute table comprises a plurality of entries, wherein each entry is associated with a unique AGI and stores a respective set of one or more memory attributes, wherein the group attribute table specifies different memory attributes for at least two different AGIs.

* * * * *

UNITED STATES PATENT AND TRADEMARK OFFICE
CERTIFICATE OF CORRECTION

PATENT NO. : 10,664,183 B1
APPLICATION NO. : 15/629680
DATED : May 26, 2020
INVENTOR(S) : Weaver et al.

Page 1 of 1

It is certified that error appears in the above-identified patent and that said Letters Patent is hereby corrected as shown below:

In the Specification

In Column 8, Line 25, delete "5121" and insert -- $512_i$ --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*